Nov. 11, 1969  W. B. BORST, JR  3,477,946
ABSORPTION PROCESS
Filed Dec. 28, 1967
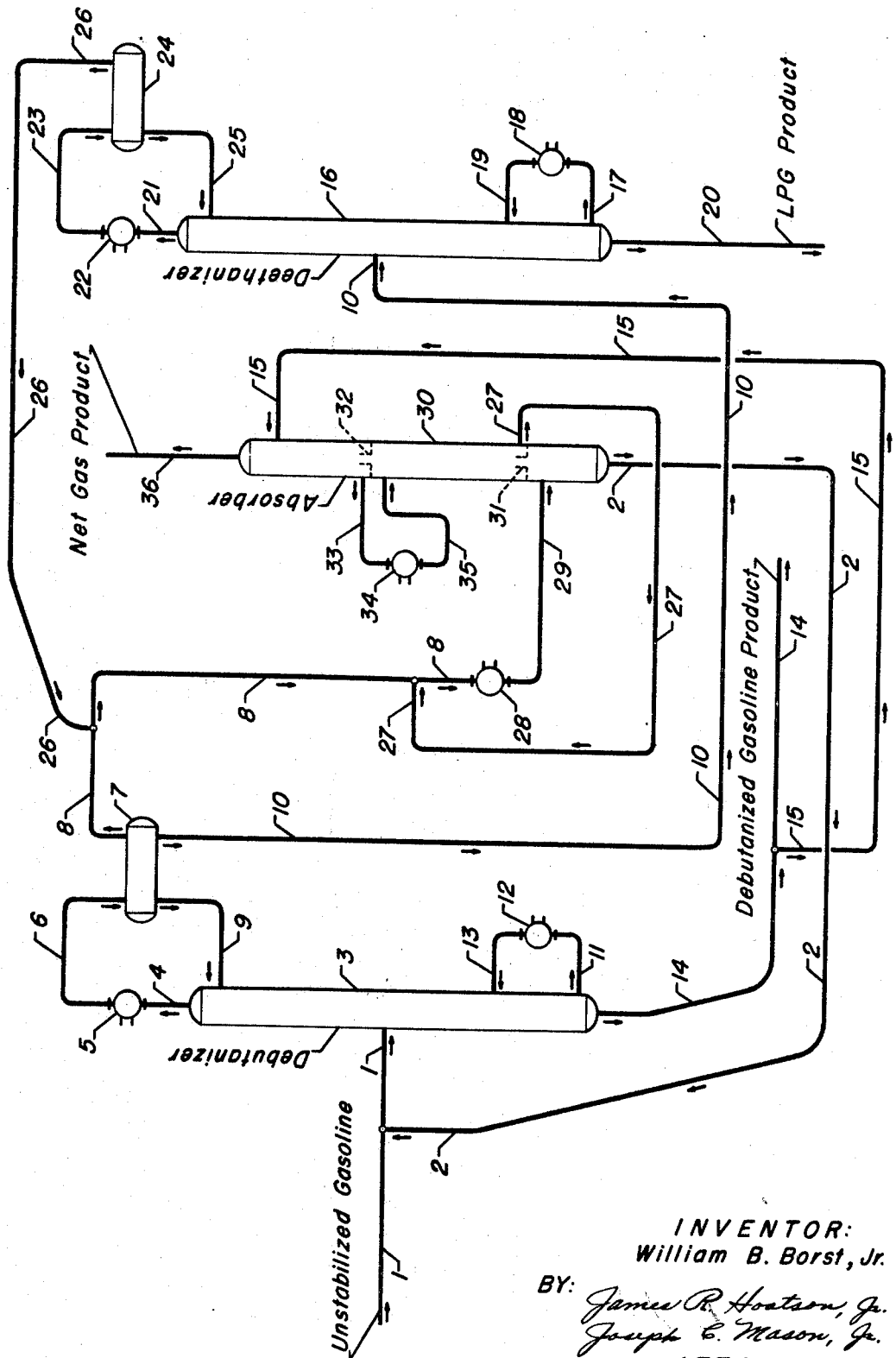
INVENTOR:
William B. Borst, Jr.
BY:
*James R. Hoatson, Jr.*
*Joseph E. Mason, Jr.*
ATTORNEYS

United States Patent Office 3,477,946
Patented Nov. 11, 1969

3,477,946
ABSORPTION PROCESS
William B. Borst, Jr., Mount Prospect, Ill., assignor to Universal Oil Products Company, Des Plaines, Ill., a corporation of Delaware
Filed Dec. 28, 1967, Ser. No. 694,279
Int. Cl. C10g 5/04
U.S. Cl. 208—344                 9 Claims

ABSTRACT OF THE DISCLOSURE

Process for recovery of desired vapor constituent from a vapor stream which comprises contacting the vapor stream with a first rich absorber oil in a contacting zone and passing the resulting mixture to a lower locus in an absorber column. The first rich absorber oil is withdrawn from the absorber column at a locus intermediate to the lean absorber oil inlet and the lower locus, while a second rich absorber oil is withdrawn from the bottom of the absorber for recovery of the desired vapor constituent. One preferred embodiment and application is found in the recovery of LPG and stabilized gasoline from an unstabilized gasoline fraction.

Field of the invention

The present invention relates to the recovery of desired vapor constituent from a vapor stream. More specifically, the present invention relates to the recovery of hydrocarbon vapor from a vapor stream in an improved absorption process. In particular, this invention relates to the recovery of LPG and debutanized gasoline in an improved separation process.

Gas or vapor absorption, as is well known by those skilled in the art, is a unit operation in which a soluble component of a gas or vapor mixture is dissolved in a liquid. Usually, the apparatus used for contacting the gas or vapor stream with liquid is a packed tower filled with a typical packing material such as Berl Saddles or Raschig Rings, or a tower containing a number of tray devices such as bubble-cap trays or sieve decks. In some applications, the contact of the liquid absorbent with the gas or vapor stream is accomplished in an empty tower into which the liquid is sprayed. Ordinarily, the gas or vapor stream and the liquid stream are made to flow counter-currently past each other in the absorption zone in order that the greatest rate of absorption may be obtained.

A typical application of such absorption processing may be found in petroleum technology. A typical process is the recovery of vaporized gasoline constituents from a natural gas stream by passing the gas through absorption towers such as described above. In such applications the natural gas is contacted counter-currently in the absorber tower by a heavy naphtha or a gas oil stream. The rich absorber oil is then heated to recover gasoline boiling range constituents and a lean absorber oil. Further application of the absorption of vapor constituents from a gas or vapor stream may be found in the fields of catalytic cracking and catalytic reforming. These refinery processing techniques produce a substantial quantity of low boiling hydrocarbon constituents, and these constituents are typically recovered by absorption. The recovered constituents find utility as raw materials for further refinery processing or as liquefied petroleum gas (LPG) which is used as a high energy fuel in locations where natural gas is unavailable to the consumer.

Description of prior art

It is well known by those skilled in the art that as the vapor or gas stream is contacted by the lean absorber oil and desired hydrocarbon constituents are dissolved therein, a substantial amount of heat is generated within the absorber column. This heat of solution or heat of absorption must be removed from the system in order that the temperature within the absorber column may not reach an excessively elevated level. It is known that as the temperature within the system increases, the rate of mass transfer decreases. Consequently, for maximum efficiency of absorption within the absorption zone, the temperature should be maintained as low as possible.

In order to maintain the temperature within the absorption zone at an optimum temperature level, it is well known that the typical absorber tower will be provided with one or more intercooling devices. In the absorption of hydrocarbons from a gas or vapor stream it is normally the art to collect the down-flowing absorber oil on intermediate trays within the absorber tower. The oil which has been increased in temperature due to the heat of absorption is passed to an external heat exchanger for cooling. The cooled absorber oil is then returned to the absorber tower below the collecting tray from which it was withdrawn. As the cooled oil flows downward through the absorber tower, it contacts up-flowing vapor or gas which is at an elevated temperature due to the absorption which has occurred in the lower region of the absorber tower. The cooled absorber liquid readily absorbs the desired hydrocarbon constituents until the amount of additional absorption reaches the point where the temperature has again been raised excessively by the heat of absorption. The enriched absorption oil is then collected on another collecting tray and removed from the tower for rechilling. By providing several such intercooling stages within the absorber tower, the overall effective temperature within the absorption system is maintained at a level which is low enough to effectively absorb the desired constituents from the vapor with optimum efficiency.

Although such absorption processing which utilizes intercoolers is relatively effective, it must be noted that only the liquid phase is cooled in the intercooler. The gas or vapor which flows upward in the absorber column is not directly cooled within the typical absorption tower, but is only cooled by the chilled absorber oil. Thus, the effectiveness of the intercoolers is only partial.

Summary of the invention

It is an object of the present invention to provide an improved process for removal of selected vapor constituents from a vapor stream. It is further object of this invention to provide an improved absorption process for the recovery of hydrocarbon vapors in a more facile and economical manner. It is one particular object of the present invention to provide an improved separation process for recovery of LPG and stabilized gasoline from an unstabilized gasoline fraction.

By the practice of this invention it is found that these objects may be accomplished by contact of the vapor stream containing the selected vapor constituent, with a rich absorber liquid in an external contacting zone of high turbulence under conditions sufficient to absorb a part of the vapor stream in the rich absorber oil. The resulting mixture is then chilled to remove the heat of absorption and passed into the absorption zone for recovery of a final vapor substantially free of the selected vapor constituent, and recovery of a final rich absorber oil containing the selected vapor constituent.

The inventive process is more clearly illustrated by the attached drawing which sets forth one preferred embodiment wherein the present invention is practiced. The process of the present invention which is presented in the drawing is an application wherein an unstabilized gasoline is separated into stabilized gasoline product and LPG product in an improved separation and absorption process.

In accordance with the practice of the present invention, a broad embodiment thereof provides a process for the removal of selected vapor constituent from a first vapor stream containing selected vapor constituent which comprises; passing said first vapor stream in admixture with a first rich absorber oil, hereinafter specified, to a contacting zone maintained under conditions sufficient to absorb at least a part of said first vapor stream into the first rich absorber oil; withdrawing from the contacting zone a mixture comprising a second rich absorber oil containing selected vapor constituent and a second vapor substantially reduced in content of selected vapor constituent; passing the mixture into an absorption zone at a lower locus under conditions sufficient to separate the second rich absorber oil and the second vapor; withdrawing the second rich absorber oil from the absorption zone; passing a lean absorber oil into the absorption zone at an upper locus; contacting the second vapor with the lean absorber oil in the absorption zone under conditions sufficient to remove selected vapor constituent from the second vapor; withdrawing from the absorption zone a third vapor having substantial freedom from selected vapor constituent; and withdrawing from the absorption zone the first rich absorber oil specified from a locus intermediate to the upper locus and the lower locus.

A more particular embodiment of this invention provides a process for recovering a stabilized hydrocarbon liquid and a condensed hydrocarbon vapor from an unstabilized hydrocarbon liquid containing normally gaseous hydrocarbons having two or more carbon atoms per molecule which comprises; passing the unstabilized hydrocarbon liquid in admixture with a first rich absorber oil into a first separation zone maintained under conditions sufficient to provide a stabilized hydrocarbon liquid product, a first liquefied vapor comprising hydrocarbons having two or more carbon atoms per molecule, and a first vapor comprising hydrocarbons having two or more carbon atoms per molecule; passing the first liquefied vapor into a second separation zone maintained under conditions sufficient to provide a second vapor containing hydrocarbon having two or more carbon atoms per molecule and to provide a second liquefied vapor containing substantially pure hydrocarbons having more than two carbon atoms per molecule; passing the first vapor from the first separation zone and passing the second vapor from the second separation zone in admixture with a second rich absorber oil hereinafter specified, to a contacting zone maintained under conditions sufficient to absorb at least a part of the vapors into the second rich absorber oil; withdrawing from the contacting zone a mixture comprising a third rich absorber oil and a third vapor substantially reduced in hydrocarbons having more than two carbon atoms per molecule; passing the mixture into an absorption zone at a lower locus under conditions sufficient to separate the third rich absorber oil and the third vapor; withdrawing the third rich absorber oil from the absorption zone as the first rich absorber oil specified; passing a first part of the stabilized hydrocarbon liquid product from the first separation zone into the absorption zone at an upper locus as a lean absorber oil; contacting the third vapor with the lean absorber oil in the absorption zone under conditions sufficient to remove hydrocarbons having more than two carbon atoms per molecule from the third vapor; withdrawing from the absorption zone a fourth vapor having substantial freedom from hydrocarbons having more than two carbon atoms per molecule; withdrawing from the absorption zone the second rich absorber oil specified from a locus intermediate to the upper locus and the lower locus; recovering a second part of the stabilized hydrocarbon liquid product from the first separation zone; and recovering the second liquefied vapor from a second separation zone as a product.

Although it is preferable to utilize the invention to recover hydrocarbon vapors as the desired or selected constituent, other selected products could be recovered utilizing the inventive absorption process in other applications. It is one particularly preferred embodiment of the present invention to recover hydrocarbons such as propane and butanes as pure compounds or as LPG, but it is also possible to utilize the present invention to recover heavier hydrocarbon constituents or even lighter hydrocarbon constituents. Thus, the present invention could be utilized for the recovery of ethane, ethylene, propane, propylene, butanes, butenes, pentanes, pentenes, hexanes, etc., either as single constituents or as mixtures. Additionally, the present invention may be utilized to recover non-hydrocarbon vapors. Thus, it is within the scope of this invention to recover as desired vapor constituent ketones, aldehydes, alcohols, hydrocarbon halides, hydrocarbon amines, mercaptans, etc., either singly or in various mixtures. In addition, the inventive process may be utilized to recover inorganic chemicals as the selected vapor constituent. For example, hydrogen halides, ammonia, sulfur oxides, carbon oxides, nitrogen oxides, and various halogens are typical inorganic chemicals which may be recovered by the practice of the present invention, either as single molecular constituents or in various mixtures.

While it is a preferred embodiment of this invention to remove the selected vapor constituent from the feed vapor and recover the selected constituent as the desired product, it must be realized that the scope of the present invention is not so limited. The present invention has equal application where the selected constituent is not a product, but a contaminant of the feed vapor. In such an application the ultimate product would be the vapor stream leaving the inventive process, and the rich oil leaving the process would contain the contaminating selected vapor constituent. Thus, the broad scope of the present invention resides in the improved method for the "removal" of selected vapor constituent from the feed vapor, and not necessarily in the recovery of the selected vapor constituent.

It is to be noted that the terms "desired vapor constituent" and "selected vapor constituent" are used interchangeably within the disclosure of this invention, and that these terms are defined to include a vapor constituent comprising a single molecular component and a vapor constituent comprising a mixture of molecular components.

The type of lean absorbent which may be utilized within the scope of the inventive process will depend upon the desired vapor constituent which must be removed from the feed vapor in the particular application. The primary consideration is a requirement of high solubility of selected constituent within the absorbent in order to minimize the amount of absorbent which must be circulated within the absorption zone. A further important consideration is the comparison of the volatility of the absorbed vapor constituent with the volatility of the lean absorbent. The difference in volatility between the selected constituent and the absorbent should be as great as possible in order to enhance the ease of subsequent separation of the selected constituent from the lean absorbent. In addition, the absorbent should be relatively inexpensive, non-corrosive, thermally stable, non-viscous, and non-foaming. Since the excess gas which leaves the absorption zone will contain vaporized or entrained lean absorbent, absorbent loss may be costly. Consequently, it is often desirable to utilize an inexpensive absorbent for the selected constituent even though other more expensive absorbents of higher desired constituent solubility characteristics are available. In general, water is often used as an absorbent for gas or vapors which are readily soluble therein. Thus, it is typical to use an aqueous absorbent in the recovery of ammonia, halogens, hydrogen halides, ketones, alcohols, etc. When hydrocarbon vapors are recovered, it is normal to utilize an absorbent comprising a hydrocarbon fraction having a higher boiling point than the hydrocarbon constituents which are absorbed. Thus, it is typical when recovering propane and butane, to utilize gasoline, naphtha, kerosine, or other heavier oil fractions as the lean absorbent. In some applications, special chemical absorbents may be used within the scope of the inventive process. For example, ethyl ether vapor may be absorbed in sulfuric acid or in meta-cresol, while hydrogen sulfide may be absorbed in amine solutions. In some absorption applications, a reversible chemical reaction may result between the lean absorbent and the constituent which is recovered therein. Thus, it is within the scope of the present invention to recover hydrogen chloride by use of an absorbent comprising an organic amine. The hydrogen chloride produces an amine hydrochloride, which upon distillation will decompose to produce a pure hydrogen chloride and the organic amine absorbent. Another typical application wherein a chemical reaction is produced is in the recovery and purification of carbon dioxide. The carbon dioxide may be dissolved in an aqueous solution of sodium or potassium carbonate, thereby producing a solution containing bicarbonate. In conclusion, it may be pointed out that the particular lean absorbent which may be utilized within the present invention will be readily ascertainable by those skilled in the art and need not be further particularized herein.

When the inventive process is applied to the recovery of a stabilized hydrocarbon liquid as a first product and a vapor constituent as a second product, various hydrocarbon liquids may provide the charge stock to the inventive process. Thus, it is within the scope of the present invention, as illustrated in the embodiments disclosed hereinabove, to charge any hydrocarbon fraction which contains low boiling vapor constituents. For example, a reactor effluent from a catalytic reforming zone may be charged to the process of the present invention in a manner sufficient to provide a stabilized reformate and a vapor fraction of high purity. A further application may be found in the processing of the hydrocarbon product from a fluid catalytic cracking (FCC) unit whereby the present invention will provide a stabilized FCC gasoline and a liquefied vapor product. It is further within the scope of this broad embodiment to process an unstabilized reactor effluent from a hydrocracking reaction zone or a hydrotreating reaction zone.

As used herein, the term "unstabilized liquid hydrocarbon fraction" refers to any hydrocarbon stock which contains dissolved normally gaseous hydrocarbons or high vapor pressure hydrocarbons which would tend to vaporize from the liquid hydrocarbon during ambient storage. Accordingly, it is within the scope of the present invention to define a stabilized liquid hydrocarbon as one which has been debutanized, and in some applications as one which has been depentanized or even dehexanized.

The broad embodiment and the more particular embodiment which have been disclosed hereinabove may be more clearly understood by now referring to the accompanying drawing in conjunction with the following disclosure of one specific example wherein the present invention is practiced.

Drawing and example

In a specific operating example illustrating an application of the inventive process, a hydrotreated naphtha was catalytically reformed over a platinum containing catalyst at a reactor inlet temperature of 990° F., a reactor pressure of 400 p.s.i.g., a volumetric liquid hourly space velocity (LHSV) of 1.3, and a hydrogen-to-hydrocarbon molecular ratio of 6.5. The resulting reactor effluent was cooled to 100° F. and passed to a receiver vessel wherein a vapor phase and an unstabilized liquid phase were separated.

Referring now to the attached drawing, the unstabilized reformate gasoline comprising the liquid phase of the reactor effluent and containing propane and butanes as selected vapor constituent leaves the reaction zone receiver, not shown, and enters the process of the present invention via line 1. This unstabilized gasoline comprising 265.75 mols/hr. of liquid hydrocarbon, dissolved hydrocarbon vapor, and dissolved hydrogen gas is augmented by a first rich absorber oil which enters line 1 via line 2, from a source hereinafter disclosed, at a rate of 40.46 mols/hr. and at a temperature of 100° F. (As used herein, mols/hr. is defined as pound moles per hour.) This total stream now amounting to 306.21 mols/hr., passes via line 1 into a debutanizer column 3 at a feed temperature of 270° F. and a pressure of 300 p.s.i.g. Column 3 is operated under conditions sufficient to debutanize the liquid hydrocarbon fraction of the total feed.

A vapor leaves the top of column 3 via line 4 at a temperature of 165° F. and a pressure of 295 p.s.i.g. The hot vapor is cooled to 100° F. in condenser 5 before passing into receiver 7 via line 6 at a pressure of 290 p.s.i.g. The condensed and cooled vapor is separated in receiver 7 at 290 p.s.i.g. to provide a liquid hydrocarbon fraction comprising propane and heavier hydrocarbons, and a debutanizer gas or vapor fraction containing propane and lighter hydrocarbons. A first part of the liquid fraction is removed from receiver 7 and passed via line 9 to the top of debutanizer column 3 as a reflux stream for the column. The debutanizer gas or vapor phase is removed from receiver 7 via line 8 at a rate of 30.14 mols/hr. or 275,000 s.c.f.d. and is processed in a manner which will be discussed hereinbelow. A second portion of the debutanizer overhead liquid is removed from receiver 7 via line 10 at a rate of 91.72 mols/hr. or 570 b.p.s.d., and this portion is sent to a deethanizer column 16 for processing in a manner to be set forth hereinbelow.

The debutanizer column 3 is provided with a typical reboiler circuit for heat input. A portion of the liquid at the bottom of debutanizer column 3 is withdrawn via line 11 at a temperature of 430° F. and passed through an exchanger 12 wherein it is heated to 455° F. before being returned via line 14 at a rate of 184.35 mols/hr. or 1.490 b.p.s.d., at a temperature of 435° F. and a pressure of 300 p.s.i.g. This debutanized gasoline stream is cooled in an exchanger means, not shown, to a temperature of 100° F. and is thereafter separated into two portions. The first portion is withdrawn from line 14 via line 15 and passed to the absorber column 30 at a rate of 16.32 mols/hr. or 130 b.p.s.d. The second portion continues via line 14 and is passed to debutanized gasoline product storage facilities, not shown, at the rate of 168.03 mols/hr. or 1,360 b.p.s.d.

The debutanizer liquid which leaves receiver 7 via line 10 enters the deethanizer column 16 at a rate of 91.72 mols/hr. and at a temperature of 160° F. and a pressure of 470 p.s.i.g. The deethanizer column 16 is operated under conditions sufficient to remove substantially all ethane and lighter constituents overhead while recovering a substantially pure propane and butane mixture as a bottoms product. The deethanizer column 16 is provided with a typical reboiler circuit. A portion of the liquid is withdrawn from the bottom of deethanizer column 16 via line 17 and passed through a reboiler exchanger 18 wherein heat is applied sufficient to operate the deethanizer column. The heated fluid is discharged from exchanger 18 and returned to the bottom of deethanizer column 16 via line 19 at a temperature of 220° F. and a pressure of 470 p.s.i.g. A net bottoms product is withdrawn from deethanizer column 16 via line 20 at the rate of 74.65 mols/hr. or 480 b.p.s.d. at a temperature of 220° F. This bottoms stream comprises propane and butane as a LPG product stream.

A net deethanizer overhead vapor is removed from deethanizer column 16 via line 21 at a temperature of 125° F. and at a pressure of 465 p.s.i.g. This vapor is cooled to 100° F. in condenser 22 before being passed via line 23 into receiver 24. A gas and a liquid phase are separated in receiver 24. The liquid phase is returned to deethanizer column 16 via line 25 to provide the reflux circuit. A net deethanizer gas stream, comprising ethane and some propane, leaves receiver 24 via line 26 at a rate of 17.07 mols/hr. or 155,000 s.c.f.d.

The deethanizer gas in line 26 is combined with the debutanizer gas in line 8 to provide a total gas stream of 47.21 mols/hr. or 430,000 s.c.f.d. This total gas stream at a temperature of 100° F. and a pressure of 280 p.s.i.g., is mixed with a second rich absorber oil entering line 8 via line 27 at a rate of 21.51 mols/hr. or 160 b.p.s.d. at a temperature of 110° F. The liquid and vapor phases are mixed within line 8 under conditions sufficient to absorb a substantial portion of the propane and butane vapor from the vapor phase into the liquid phase. The resulting mixed stream enters a cooler 28 via line 8 at a temperature of 120° F. Cooler 28 removes 90,000 B.t.u./hr. from the mixed stream in cooling it to 100° F. The 90,000 B.t.u./hr. comprises the heat of absorption which resulted in contacting the liquid and the vapor phases in line 8. The resulting mixture comprises a butane and propane enriched-liquid and a vapor phase which is reduced in propane and butane content. This phase mixture leaves cooler 28 and enters absorber column 30 via line 29 at a temperature of 100° F. and a pressure of 275 p.s.i.g. The vapor and liquid phases separate in a settling zone comprising the bottom of absorber column 30. A net liquid is removed from the bottom of the absorber 30 via line 2 at the rate of 40.46 mols/hr. This net liquid comprises the first rich absorber oil containing propane and butane and is passed to line 1 for fractionation in the debutanizer column with the unstabilized reformate gasoline in the manner previously discussed.

The vapor phase which is separated in the bottom of absorber 30 passes up through a liquid collecting tray 31 at the rate of 28.26 mols/hr. and at a temperature of 100° F. and a pressure of 275 p.s.i.g. This internal vapor stream is contacted with absorber oil which passes downward through absorber column 30 and collects on tray 31. This rich absorber oil is removed from tray 31 and absorber 30 via line 27 at a rate of 21.51 mols-hr. and comprises the second rich absorber oil noted hereinabove. This second rich absorber oil is passed via line 27 into line 8 where it contacts the total gas stream being fed to the absorber column 30 in the manner previously disclosed.

As the internal vapor passes upward in absorber column 30, it is contacted with down-flowing absorber oil in a manner sufficient to remove substantially all of the propane and the butane contained in the vapor. A lean absorber oil enters column 30 via line 15 at the rate of 16.32 mols/hr. or 130 b.p.s.d. This lean absorber oil consists of the first portion of the debutanized gasoline which was removed from the debutanizer column via line 14 as previously disclosed hereinabove. As the internal vapor is contacted with this lean absorber oil in absorber column 30, heat of absorption is generated. In order to withdraw this heat from the system, the heated absorber oil is collected at a locus which is substantially in the middle of column 30 on a collecting tray 32. The heated absorber oil is withdrawn from collecting tray 32 and column 30 via line 33 at a temperature of 125° F. at a rate of 18.66 mols/hr. This hot absorber oil passes via line 33 into cooler 34 wherein 20,000 b.t.u./hr. of sensible heat is removed. The cooled absorber oil leaves cooler 34 at a temperature of 100° F., and a pressure of 270 p.s.i.g., and it is returned to absorber column 30 via line 35 at a point just below collecting tray 32. The internal vapor passing upward in column 30 passes through collecting tray 32 and is contacted with the lean absorber oil in the absorption zone above tray 32 for removal of additional propane and butane from the rising vapors. A resulting net gas product is withdrawn from the top of absorber column 30 via line 36 at a temperature of 105° F. at a pressure of 270 p.s.i.g. This gas product is substantially free of propane and butane constituents and is passed into a fuel gas header at a rate of 23.07 mols/hr. of 210,000 s.c.f.d.

Preferred embodiment

The effectiveness of the present invention may be clearly ascertained from the foregoing example.

It will be seen that a major part of the heat of absorption for the inventive process is removed externally from the absorber tower. The chilling heat exchanger 28 of the contacting zone removed 90,000 b.t.u./hr. of the heat of absorption while a single inner cooler was required to remove 20,000 b.t.u./hr. In the prior art, absorption of the input gas composition illustrated by this example would typically require at least two and possibly three absorber tower intercoolers. Since the major portion of the heat of absorption is generated when the vapor its first contacted with the absorber oil, the bottom of the absorber tower 30 would typically become excessively hot, thereby reducing the effectiveness of the mass transfer rate in the lower portion of the tower. Therefore, in the typical absorber tower, it is often necessary to provide on intercooler for absorber liquid at the second or third deck above the bottom of the tower. While such an intercooler installation is effective to remove the absorbed heat from the liquid flowing down through the bottom of the tower, the vapor pasing up through the lower decks retains its high temperature since it does not pass to the intercooler. However, as noted in the instant example, the vapor passing up through the lower decks of absorber tower 30 via tray 31 has been cooled to 100° F. by the process of the present invention. Thus, the lower decks of the absorber tower are more effective in absorbing selected vapor constituent, which in the example was a mixture of propane and butanes.

In addition, it will be noted that by the process of the present invention, the temperature of the vapor which passes through deck 31 may always be maintained at 100° F. or even lower, regardless of the composition of the feed gas. In addition, any fluctuation in vapor through-put may be compensated for by the inventive contacting zone. The temperature of the total feed to the absorber tower via line 29 may at all times be controlled at 100° F. or lower. Without the inventive process, however, if the vapor stream were introduced directly into the absorber column, any fluctuation in through-put or in vapor composition would cause the absorber column temperature to fluctuate accordingly.

It will also be seen from the foregoing example that although 47.21 mols/hr. of vapor was fed to the absorption system, only 28.26 mols/hr. of vapor passed up through tray 31 and into absorber column 30. Consequently, the overall liquid to vapor ratio within the absorption column is higher for the same liquid circulation rate by the practice of the present invention in comparison to operation in the typical prior art manner. Since this effective liquid to vapor ratio is higher, the efficiency of the absorption is also higher.

It will also be seen that since the net vapor flow within absorption tower 30 has been substantially reduced by the inventive process, the tower diameter required for the column may also be reduced. Since the tower diameter is sized by taking into account the liquid load and the vapor load within the tower, the reduction in diameter will not be in direct proportion to the reduction of the vapor flow. However, it will be readily seen that the reduction in vapor flow is so substantial in the inventive process that a considerable reduction in tower diameter may be effected with a resulting savings in capital expenditure.

It must be realized that the operating conditions which have been given in the foregoing example are specific to that example and should not be construed as a limitation upon the operation of the present invention. Those skilled in the art may readily ascertain those particular operating conditions which may be required in order to achieve any given separation of hydrocarbon constituents or any other absorption of selected vapor constituents within the absorption zone.

Those skilled in the art will know that the rate of absorption may be enhanced by increased pressure and temperature regardless of the chemical constituents being processed within the inventive process. For example, when the inventive process is applied to the recovery of LPG constituents, it is preferable to keep the temperature as low as possible and certainly to maintain the temperature of the absorption zone below 150° F. Any temperature substantially above this level will result in reduced absorption efficiency unless the pressure is increased above the level of 275 p.s.i.g. as shown in the example. Since cooling water provides the cooling medium in the typical petroleum refinery application, it is normal to operate at a temperature of from 60 to 130° F., and preferably at a temperature of 100° F. or less, within the absorption zone and the contacting zone. Pressure levels required within the absorption zone and the contacting zone typically are in the range of from 200 to 350 p.s.i.g. and preferably, about 275 to 300 p.s.i.g. Where the hydrocarbon constituent which is recovered within the inventive process has a vapor pressure which is lower than that of LPG, the temperature may be maintained as noted herein, but the pressure within the absorption zone and the contacting zone may be reduced accordingly.

A further operating condition which has importance in effectively absorbing the desire vapor constituent into the absorber oil is the ratio of lean oil to incoming vapor. In the above example, 16.32 mols/hr. of lean absorber oil was utilized in contacting 47.21 mols/hr. of total input gas. This comprises a liquid to vapor ratio of approximately 1 to 3. However, it is not possible to define a broad range of liquid to vapor ratios under which the present invention may be operated since there are a great many factors which must be considered before selecting the ratio. The actual constituent which must be absorbed and the percent which must be recovered are of primary consideration. In addition, the actual temperature and pressure which have been selected for the contacting zone and the absorption zone will influence the liquid to vapor ratio. It must also be noted that the composition of the lean absorber oil and the total composition of the incoming vapor will have a pronounced effect upon the ratio to be selected. In selecting the ratio at which the vapor must be contacted with the absorbent, the vapor-liquid equilibrium must not only be considered for the selected vapor constituent within the absorber oil, but also the vapor-liquid equilibrium of those constituents which are not to be absorbed must also be taken into account. However, those skilled in the art are competent to readily select a desirable vapor-liquid ratio for any specific application of the present invention from the considerations listed hereinabove and from the teachings provided herein.

It must be pointed out that the specific operating conditions which may be required within the contacting zone and the absorption zone for any specific chemical application are readily ascertainable by those skilled in the art of gas absorption. Although the above discussion relates to the recovery of desired hydrocarbon constituents, the teachings are sufficient to define those considerations which may be necessary for application of the inventive process to the recovery of selected vapor constituents which are not hydrocarbons. Those skilled in the art are competent to apply the teachings of this invention to their specific application and to judiciously select the specific absorbent required, the temperature and pressure of operation, the vapor-liquid ratio required, the equipment size (column height, diameter, and tray spacing), the equipment type selection, etc., in a manner sufficient to achieve the benefits of the present invention.

The operating conditions which may be required within debutanizer 3 and deethanizer 16 are also readily ascertainable by those skilled in the art. It is typical to operate a debutanizer column within the range from 150 p.s.i.g. to 300 p.s.i.g. and preferable to operate a debutanizer column at about 250 p.s.i.g. The temperature level required may be readily ascertained once the pressure level has been established since the temperature at which the desired liquid and vapor separation may be accomplished is determined from the volatility characteristics of the system as affected by the composition of the unstabilized hydrocarbon. It must be noted, however, that a debutanizer column should generally not be operated above 300 p.s.i.g. since it then becomes extremely difficult to remove butanes from the heavier hydrocarbon fraction, since at pressures in excess of 300 p.s.i.g. the psuedo-critical point for the liquid mixture in the bottom of the tower is approached. Similarly, those skilled in the art may readily ascertain the conditions of temperature and pressure which may be necessary for the deethanizer column 16. Again, it should be noted that the deethanizer normally will not exceed 475 p.s.i.g. in pressure since pressures above this level make it extremely difficult to remove ethane from the heavier hydrocarbon components, since at pressures above 475 p.s.i.g. the psuedo-critical point for the liquid mixture in the bottom of the deethanizer is approached.

While the instant example was illustrative of the stabilization of a hydrocarbon fraction by debutanizing, it should be noted that the process of this invention is equally applicable wherein the hydrocarbon fraction is stabilized by depentanization or deisohexanization. When the debutanizer column 3 comprises a depentanizer operation, the stabilized gasoline product will contain hexanes and heavier hydrocarbon constituents and the bottoms fraction leaving the deethanizer column 16 via line 20 will contain propane, butanes, and pentanes. When debutanizer column 3 may be operated as a deisohexanizer, the bottoms fraction leaving column 16 via line 20 would contain isohexane as well as propane, butanes, and pentanes.

It must be pointed out that in the example given hereinabove, the contacting zone does not contain a specific mixing apparatus. However, for effectiveness of the present invention, it is necessary that the incoming vapor stream containing the desired vapor constituents be contacted with the rich absorber liquid in a zone of high turbulence in order that there be sufficient contacting of the vapor and liquid phases to enable the selected vapor constituents to pass into solution. In the instant example note above, no mixing apparatus is necessary since the rich absorber oil recovered from tray 31 is supplied to line 8 via line 27 by a pump, not shown, and the diameter of line 8 is such as to provide for a high degree of turbulence within the line and within heat exchanger 28. Consequently, no mixing device is found necessary. However, it may be found in some applications wherein the present invention may be practiced that a mixing apparatus must be installed in line 8 in order to provide the necessary degree of turbulence. Such an apparatus may consist of any commercial mixing device such as a motor driven in-line mixer or it may consist merely of one or more mixing orifices. It must be noted that the mixing devices (or lack thereof) which are necessary to provide the degree of turbulence are not a limitation upon the scope of the present invention.

From the foregoing disclosure it may now be summarized that one preferred embodiment of the present invention comprises a process for the recovery of debutanized gasoline and LPG from an unstabilized gasoline containing hydrocarbon vapors having from one to four carbon atoms per molecule which comprises passing the unstabilized gasoline in admixture with a first rich absorption oil into a first separation zone maintained under conditions sufficient to provide a debutanized gasoline product, a first liquefied vapor comprising hydrocarbons having at least four carbon atoms per molecule, and a first vapor comprising hydrocarbons having at least four carbon atoms per molecule; passing the first liquefied vapor into a second separation zone maintained under conditions sufficient to provide a second vapor containing hydrocarbons having more than two carbon atoms per molecule, and to provide a second liquefied vapor containing substantially pure hydrocarbons having from three to four carbon atoms per molecule; passing the first vapor from the first separation zone and passing the second vapor from the second separation zone in admixture with a second rich absorber oil hereinafter specified, to a contacting zone maintained under conditions sufficient to absorb at least a part of the vapors into the second rich absorber oil; withdrawing from the contacting zone a mixture comprising a third rich absorber oil and a third vapor substantially reduced in hydrocarbons having rfom three to four carbon atoms per molecule; passing the mixture into an absorption zone at a lower locus under conditions sufficient to separate the third rich absorber oil and the third vapor; withdrawing the third rich absorber oil from the absorption zone as the first rich absorber oil specified; passing a first part of the debutanized gasoline product from the first separation zone into the absorption zone at an upper locus as a lean absorber oil; contacting the third vapor with the lean absorber oil in the absorption zone under conditions sufficient to remove hydrocarbons having three and four carbon atoms per molecule from the third vapor; withdrawing from the absorption zone a fourth vapor having substantial freedom from hydrocarbons having from three to four carbon atoms per molecule; withdrawing from the absorption zone a second rich absorber oil specified from a locus intermediate to the upper locus and the lower locus; recovering a second part of the debutanized gasoline product from the first separation zone; and recovering the second liquefied vapor from the second separation zone as LPG product.

The invention claimed:

1. Process for the removal of selected vapor constituent from a first vapor stream containing said selected vapor which comprises:
    (a) passing said first vapor stream in admixture with a first rich absorber oil hereinafter specified to a contacting zone maintained under conditions sufficient to absorb at least a part of said vapor stream into said first rich absorber oil;
    (b) withdrawing from said contacting zone a mixture comprising a second rich absorber oil containing selected vapor constituent and a second vapor substantially reduced in content of said selected vapor constituent;
    (c) passing said mixture into an absorption zone at a lower locus under conditions sufficient to separate said second rich absorber oil and said second vapor;
    (d) withdrawing said second rich absorber oil from said absorption zone;
    (e) passing a lean absorber oil into said absorption zone at an upper locus;
    (f) contacting said second vapor with said lean absorber oil in said absorption zone under conditions sufficient to remove selected vapor constituent from said second vapor;
    (g) withdrawing from said absorption zone a third vapor having substantial freedom from selected vapor constituent; and,
    (h) withdrawing from said absorption zone said first rich absorber oil specified from a locus intermediate to said upper locus and said lower locus.

2. Process of claim 1 wherein said selected vapor constituent is recovered as a product from said second rich absorber oil.

3. Process of claim 1 wherein said selected vapor constituent is withdrawn from said second rich absorber oil in a manner sufficient to provide at least a part of said lean absorber oil.

4. Process of claim 1 wherein said selected vapor constituent comprises one of the group consisting of a vaporized hydrocarbon and a mixture of vaporized hydrocarbons.

5. Process of claim 4 wherein said selected vapor constituent comprises one of the group consisting of propane, n-butane, iso-butane, a butane mixture, and a mixture of propane and butanes.

6. Process of claim 4 wherein said selected vapor constitent comprises a mixture of hydrocarbons having four or more carbon atoms per molecule.

7. Process for the recovery of a stabilized hydrocarbon liquid and condensed hydrocarbon vapor from an unstabilized hydrocarbon liquid containing hydrocarbon vapors having two or more carbon atoms per molecule which comprises:
    (a) passing said unstabilized hydrocarbon liquid in admixture with a first rich absorber oil into a first separation zone maintained under conditions sufficient to provide a stabilized hydrocarbon liquid product, a first liquefied vapor comprising hydrocarbons having two or more carbon atoms per molecule, and a first vapor comprising hydrocarbons having two or more carbon atoms per molecule;
    (b) passing said first liquefied vapor into a second separation zone maintained under conditions sufficient to provide a second vapor containing hydrocarbons having two or more carbon atoms per molecule, and to provide a second liquefied vapor containing substantially pure hydrocarbons having more than two carbon atoms per molecule;
    (c) passing said first vapor from said first separation zone and passing said second vapor from said second separation zone in admixture with a second rich absorber oil hereinafter specified, to a contacting zone maintained under conditions sufficient to absorb at least a part of said vapors into said second rich absorber oil;
    (d) withdrawing from said contacting zone a mixture comprising a third rich absorber oil and a third vapor substantially reduced in hydrocarbons having more than two carbon atoms per molecule;
    (e) passing said mixture into an absorption zone at a lower locus under conditions sufficient to separate said third rich absorber oil and said third vapor;
    (f) withdrawing said third rich absorber oil from said absorption zone as said first rich absorber oil specified;
    (g) passing a first part of said stabilized hydrocarbon liquid product from said first separation zone into said absorption zone at an upper locus as a lean absorber oil;
    (h) contacting said third vapor with said lean absorber oil in said absorption zone under conditions sufficient to remove hydrocarbons having more than two carbon atoms per molecule from said third vapor;
    (i) withdrawing from said absorption zone a fourth vapor having substantial freedom from hydrocarbons having more than two carbon atoms per molecule;
    (j) withdrawing from said absorption zone said second rich absorber oil specified from a locus intermediate to said upper locus and said lower locus;
    (k) recovering a second part of said stabilized hydrocarbon liquid product from said first separation zone; and,
    (l) recovering said second liquefied vapor from said second separation zone as product.

8. Process of claim 7 wherein said stabilized hydrocarbon liquid is a debutanized liquid and said second liquefied vapor comprises propane and butanes.

9. Process of claim 7 wherein said stabilized hydrocarbon liquid is a depentanized liquid and said second liquefied vapor contains pentanes.

References Cited

UNITED STATES PATENTS

| | | | |
|---|---|---|---|
| 2,299,830 | 10/1942 | Legatski et al. | 208—341 |
| 2,339,680 | 1/1944 | Carney | 208—341 |
| 2,710,278 | 6/1955 | Gilmore | 208—341 |
| 2,939,834 | 6/1960 | Evans | 208—342 |
| 3,154,482 | 10/1964 | Cahn et al. | 208—341 |

HERBERT LEVINE, Primary Examiner

U.S. Cl. X.R.

23—309; 208—342